United States Patent [19]

Chan

[11] Patent Number: 5,076,196
[45] Date of Patent: Dec. 31, 1991

[54] TRAFFIC WARNING MAT

[76] Inventor: Alex Chan, 2021 Pennington Dr., Arlington, Tex. 76014

[21] Appl. No.: 705,342

[22] Filed: May 24, 1991

[51] Int. Cl.⁵ .................. G09F 17/00; G09F 7/20; G09F 21/04
[52] U.S. Cl. .................................... 116/28 R; 40/591
[58] Field of Search ............... 40/591, 603, 604, 607, 40/610, 612; 116/28 R, 173, 209

[56] References Cited

U.S. PATENT DOCUMENTS

| | | | |
|---|---|---|---|
| 3,430,374 | 3/1969 | Woodard | 40/591 |
| 3,594,938 | 7/1971 | Mosch | 40/591 |
| 3,701,210 | 10/1972 | Smith | 40/591 |
| 3,949,503 | 4/1976 | Waress | 40/591 |
| 4,021,948 | 5/1977 | Mosch | 40/591 |
| 4,044,482 | 8/1977 | Mosch | 40/591 |

Primary Examiner—William A. Cuchlinski, Jr.
Assistant Examiner—W. Morris Worth
Attorney, Agent, or Firm—Henderson & Sturm

[57] ABSTRACT

A traffic warning mat apparatus is provided for use in combination with a vehicle of a type having a trunk lid pivotally attached to the vehicle. A mat is adapted to be disposed on the rear of an automobile. A light reflecting material is disposed on one side of the mat for making the mat highly visible to vehicles with headlights which shine onto the mat or, under daylight conditions, can be easily seen. Straps are connected between the top of the mat and a gutter hook which extends around the front end of the trunk lid. Straps are attached to the bottom of the mat and have gutter hooks thereon for attachment to the underside of a vehicle or to the bottom of a bumper thereof. Additionally, straps are connected to the side edges of the mat and these straps have gutter hooks on one end thereof for attachment to the bottom rear ledge of the trunk lid. Each of the aforementioned straps include mechanisms for tightening the straps for securing the mat on the rear of the automobile when in use.

3 Claims, 1 Drawing Sheet

U.S. Patent … Dec. 31, 1991 … 5,076,196
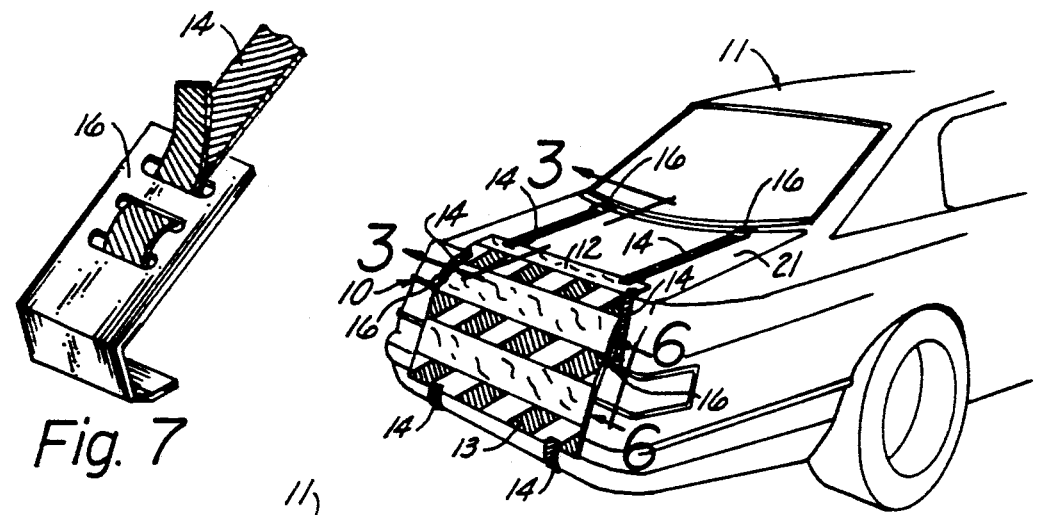
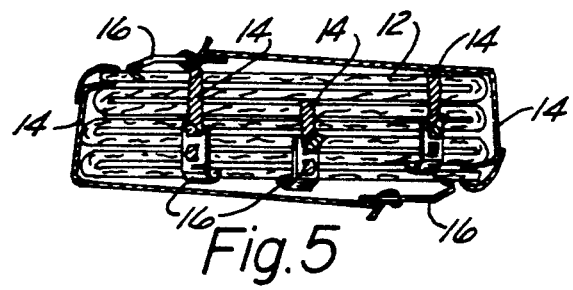

TRAFFIC WARNING MAT

TECHNICAL FIELD

The present invention relates generally to a traffic warning mat and more particularly to such a mat which can be quickly and easily fastened to the rear of an automobile either with the trunk open or the trunk closed. It also can be fastened to the rear doors of a van, mini-van, truck, pickup truck, lift back, hatch back, etc.

BACKGROUND ART

When an automobile becomes disabled on or adjacent to a roadway, a substantial danger is presented. It is well known that such a stationary, disabled vehicle constitutes a serious hazard to the safety of its passengers as well as to approaching vehicles. This problem is exacerbated if for any reason the flashing hazard lights do not work or have not been installed on such vehicle.

Various products have been designed to address the aforementioned problem, for example U.S. Pat. No. 4,607,444 to Foster shows a device for hanging a sign in the rear back window of an automobile or to adhesively attach such a sign to the extreme rear end of a vehicle. A problem with hanging such a sign in a rear window is that hooks need to be installed on the inside top of the car and furthermore the sign is necessarily limited in size because of the space available inside the rear window of the vehicle. A problem with adhesively sticking the sign onto the rear of the automobile is that the paint can be damaged or removed when the sign is removed from the vehicle. Other warning signs for disabled vehicles are shown in U.S. Pat. Nos. 3,430,374 to Woodard, 3,594,938 to Mosch and 4,044,482 to Mosch. One of the problems with the structures disclosed in the last three patents referred to above is that the trunk of the automobile must be in an open position when they are used. One problem with this arrangement is that the automobile may need to be left unattended and there may be other things in the trunk which could be stolen under these circumstances. Furthermore, an open trunk also would permit a prospective thief to gain easy access to the interior of the automobile by pushing in the back seat. Also, the rods, fasteners and roller arrangements disclosed in these patents make them bulky and expensive. One embodiment of the first mentioned Mosch patent even requires that a fastener be clamped between the rear window and its frame.

Consequently, there is a need for a traffic warning mat which will overcome the aforementioned problems of the prior art.

DISCLOSURE OF THE INVENTION

The present invention relates to a traffic warning mat apparatus for use in combination with a vehicle of a type having a trunk lid pivotally attached to the vehicle. It can also be used on rear doors of a van, mini-van, truck, pickup truck, trailers and cars with lift backs. The trunk lid, of course, has a forward edge, a rear edge and side edges disposed therebetween. A mat is adapted to be disposed on the rear of an automobile and also has a top edge, a bottom edge and two side edges disposed therebetween. A light reflecting material is disposed on one side of the mat for making the mat highly visible to vehicles with headlights which shine onto the mat or, under daylight conditions, can be easily seen.

Straps are connected between the top of the mat and a gutter hook which extends around the front end of the trunk lid. Straps are attached to the bottom of the mat and have gutter hooks thereon for attachment to the underside of a vehicle or to the bottom of a bumper thereof. Additionally, straps are connected to the side edges of the mat and these straps have gutter hooks on one end thereof for attachment to the bottom rear edge of the trunk lid. Each of the aforementioned straps include mechanisms for tightening the straps to be sure that the mat is secure on the rear of the automobile when in use.

An object of the present invention is to provide an improved traffic warning apparatus.

Another object of the present invention is to provide an improved traffic warning mat which can be connected to the rear of an automobile with the trunk closed or with the trunk open.

A further object of the present invention is to provide a traffic warning mat apparatus of the aforementioned type which is compact and inexpensive to produce.

A still further object of the present invention is to provide an improved traffic warning mat apparatus which permits fast and easy installation.

A still further object of the present invention is to provide a traffic warning mat which does not require the user to open rear windows or trunks in order to utilize it and thereby discourages theft of articles in the vehicle and discourages theft of the vehicle itself.

Other objects, advantages, and novel features of the present invention will become apparent from the following detailed description of the invention when considered in conjunction with the accompanying drawings.

BRIEF DESCRIPTION OF THE DRAWINGS

FIG. 1 is perspective view of a preferred embodiment of the present invention shown attached to an automobile with the trunk thereof closed;

FIG. 2 is a perspective view of a preferred embodiment of the present invention shown attached to an automobile with the trunk lid open;

FIG. 3 is a cross-sectional view taken along line 3—3 of FIG. 1;

FIG. 4 is a partial, perspective view of one of the straps on the top of the trunk lid showing the connection between the top of the mat and the front lip of the trunk lid;

FIG. 5 is a cross-sectional view showing how the mat can be folded into a compact position for storage in the trunk of the vehicle;

FIG. 6 is a cross-sectional view taken along line 6—6 of FIG. 1; and

FIG. 7 is an enlarged perspective view of one of the gutter hooks and adjustable straps which can be utilized in this invention.

BEST MODE FOR CARRYING OUT THE INVENTION

Referring now to the drawings wherein like reference numerals designate identical or corresponding parts throughout the several views, FIG. 1 shows a traffic warning mat apparatus (10) constructed in accordance with the present invention and being attached to a vehicle (11). A mat (12) can be constructed of a sheet of plastic such as polyvinylchloride, cardboard or other suitable material. Reflective strips (13) are attached to one side of the mat (12) and preferably have neo light reflective material therein so that they are highly visible in the daylight and will reflect light back from headlights which shine thereon during nighttime conditions. The stripes can be horizontal, have alternate colors or any combination of these features.

Straps (14) are attached at one end by a sewn loop (15) through openings in the mat (12). These straps can alternatively be sewn onto the mat. The other end of the strap (14) is threaded through a series of three openings in gutter hooks (16). The three openings in loosen the straps (14) so that the device can adjust to the size and shape of virtually any vehicle. Two of these straps (14) and gutter hooks (16) are extended across the top of the trunk lid (21) as is shown in FIGS. 1, 2 and 3. FIG. 6 shows how the bottom lip of the trunk lid is encompassed by gutter hooks (16) which extend from a top side portion of the mat (12) and downwardly therefrom. Two more of these straps (14) are connected to the bottom of the mat (12) and extend downwardly so that the gutter hooks (16) can extend around the lower lip of the bumper (22) of the vehicle (11) essentially in the manner shown in FIG. 6. Also, hooks can be extended around the top of trunk lid (21) and fasten inside the trunk on the back side of the trunk lid (21) to prevent theft of the mat (12).

If it is desired to employ the mat (12) with the trunk lid (21) open, the length of the straps (14) will need to be adjusted to some extent to accommodate this arrangement but, just as when the trunk lid (21) is closed as shown in FIG. 1, these adjustments can easily and quickly be made to accommodate a vehicle of any size or shape.

FIG. 5 shows an arrangement whereby the mat (12) can be folded to a very compact size and stored in the trunk so that it will not take up much space until and unless it is actually needed. FIG. 7 shows a combined gutter hook (16) and length adjusting mechanism, but it will be appreciated that different types of strap tighteners can be used in this invention, some of which may not be built into gutter hooks (16).

Accordingly, it will be appreciated that the present invention does indeed accomplish the aforementioned objects. Obviously many modifications and variations of the present invention are possible in light of the above teachings. For example, more or less straps (14) can be used. It is therefore to be understood that, within the scope of the appended claims, the invention may be practiced otherwise than as specifically described.

I claim:

1. A traffic warning mat apparatus for use in combination with a vehicle of a type having a rear bumper and a trunk lid pivotally attached to said vehicle, said trunk lid having a forward edge, a rear edge and side edges disposed between said front and rear edges and a rear bumper having a lower rear edge disposed thereon; said traffic warning mat comprising:

a mat adapted to be disposed on the rear of a vehicle, said mat having a top edge, a bottom edge and two side edges disposed between said top and bottom edges;

a light reflective material disposed on one side of said mat for making the mat visible to vehicles with headlights which shine onto said mat;

a first flexible member attached at one end thereof to said top edge of said mat;

first rigid hook means attached to the said first flexible member for extending around said forward edge of said trunk lid;

means for tightening said first flexible member between where it connects to the top edge and where it connects to said first rigid hook means;

a second flexible member attached at one end thereof to said bottom edge of said mat;

second rigid hook means attached to the said second flexible member for extending around said lower rear edge of said bumper; and means for tightening said second flexible member between where it connects to the bottom edge of the mat and where it connects to said second rigid hook means whereby said mat will be held in place on the rear of the vehicle for safety purposes.

2. The apparatus of claim 1 including:

a third flexible member attached at one end thereof to one side edge of said mat;

hook means attached to said third a third rigid flexible member for extending around rear edges of the trunk lid; and means for tightening said third flexible member between where it connects to said one side edge of the mat and where it connects to said third rigid hook means.

3. The apparatus of claim 2 including:

a fourth flexible member attached at one end thereof to the other side edge of said mat;

a fourth rigid hook means attached to said fourth flexible member for extending around the rear edge of the trunk lid; and means for tightening said fourth flexible member between where it connects to said other side edge of the mat and where it connects to said fourth rigid hook means.

* * * * *